United States Patent
Stich et al.

(10) Patent No.: US 9,460,546 B1
(45) Date of Patent: Oct. 4, 2016

(54) HIERARCHICAL STRUCTURE FOR ACCELERATING RAY TRACING OPERATIONS IN SCENE RENDERING

(75) Inventors: Martin Stich, Berlin (DE); Steven Parker, Salt Lake City, UT (US); Heiko Friedrich, Beckingen-Honzrath (DE); Andreas Dietrich, Heltersberg (DE)

(73) Assignee: NVIDIA CORPORATION, Santa Clara, CA (US)

( * ) Notice: Subject to any disclaimer, the term of this patent is extended or adjusted under 35 U.S.C. 154(b) by 59 days.

(21) Appl. No.: 13/076,371

(22) Filed: Mar. 30, 2011

(51) Int. Cl.
*G06T 15/50* (2011.01)
*G06T 15/06* (2011.01)
*G06T 17/00* (2006.01)

(52) U.S. Cl.
CPC ............ *G06T 15/06* (2013.01); *G06T 17/005* (2013.01)

(58) Field of Classification Search
CPC .. G06T 15/06; G06T 17/005; G06T 2210/61
See application file for complete search history.

(56) References Cited

U.S. PATENT DOCUMENTS

| | | |
|---|---|---|
| 4,897,806 A | 1/1990 | Cook et al. |
| 5,113,493 A | 5/1992 | Crosby |
| 5,222,203 A | 6/1993 | Obata |
| 5,239,624 A | 8/1993 | Cook et al. |
| 5,289,565 A | 2/1994 | Smith et al. |
| 5,299,298 A | 3/1994 | Elmquist et al. |
| 5,357,579 A | 10/1994 | Buchner et al. |
| 5,384,667 A | 1/1995 | Beckwith |
| 5,402,534 A | 3/1995 | Yeomans |
| 5,465,119 A | 11/1995 | Demos |
| 5,684,935 A | 11/1997 | Demesa, III et al. |
| 5,729,672 A | 3/1998 | Ashton |
| 5,737,027 A | 4/1998 | Demos |
| 5,809,219 A | 9/1998 | Pearce et al. |
| 5,870,096 A | 2/1999 | Anjyo et al. |
| 5,933,146 A * | 8/1999 | Wrigley ................. 345/420 |

(Continued)

FOREIGN PATENT DOCUMENTS

| | | |
|---|---|---|
| CN | 1856805 | 11/2006 |
| CN | 101599181 A | 12/2009 |
| WO | 2012115711 | 8/2012 |

OTHER PUBLICATIONS

Djeu P., Hunt W., Wang R., Elhassan I., Stoll G., Mark W. R., "Razor: An Architecture for Dynamic Multiresolution Ray Tracing." Tech. rep., University of Texas at Austin Dep. of Comp. Science, 2007. Conditionally accepted to ACM transactions on Graphics.*

(Continued)

*Primary Examiner* — Kee M Tung
*Assistant Examiner* — Nicholas R Wilson (57) ABSTRACT

A hierarchical structure for accelerating ray tracing operations in scene rendering includes a plurality of geometry objects, and a single acceleration structure constructed over the collective plurality of geometry objects. Each geometry object includes primitives of a predefined type, whereby primitives within the plurality of geometry objects collectively define a geometry included within a region of the scene which is to be rendered. The single acceleration structure is operable for accelerating ray tracing operations for the primitives included within the plurality of geometry objects, and is constructed over the plurality of the geometry objects without an intervening bounding volume representation of the plurality of primitives included within the geometry objects.

18 Claims, 3 Drawing Sheets

(56) References Cited

U.S. PATENT DOCUMENTS

| | | | |
|---|---|---|---|
| 5,973,700 A | 10/1999 | Taylor et al. | |
| 5,982,385 A | 11/1999 | Fish et al. | |
| 6,034,667 A | 3/2000 | Barrett | |
| 6,211,882 B1 | 4/2001 | Pearce et al. | |
| 6,300,956 B1 | 10/2001 | Apodaca et al. | |
| 6,618,048 B1 | 9/2003 | Leather | |
| 6,636,214 B1 | 10/2003 | Leather et al. | |
| 6,700,586 B1 | 3/2004 | Demers | |
| 6,707,458 B1 | 3/2004 | Leather et al. | |
| 6,717,577 B1 | 4/2004 | Cheng et al. | |
| 6,720,975 B1 | 4/2004 | Dietrich, Jr. | |
| 6,811,489 B1 | 11/2004 | Shimizu et al. | |
| 6,867,781 B1 | 3/2005 | Van Hook et al. | |
| 6,885,384 B2 | 4/2005 | Deering et al. | |
| 6,999,100 B1 | 2/2006 | Leather et al. | |
| 7,002,591 B1 | 2/2006 | Leather et al. | |
| 7,034,828 B1 | 4/2006 | Drebin et al. | |
| 7,050,066 B2 | 5/2006 | Ohta | |
| 7,061,502 B1 | 6/2006 | Law et al. | |
| 7,075,545 B2 | 7/2006 | Van Hook et al. | |
| 7,119,813 B1 | 10/2006 | Hollis et al. | |
| 7,133,041 B2 | 11/2006 | Kaufman et al. | |
| 7,133,047 B2 | 11/2006 | Pallister | |
| 7,136,081 B2 | 11/2006 | Gritz et al. | |
| 7,176,919 B2 | 2/2007 | Drebin et al. | |
| 7,184,059 B1 | 2/2007 | Fouladi et al. | |
| 7,187,379 B2 | 3/2007 | Keller | |
| 7,196,710 B1 | 3/2007 | Fouladi et al. | |
| 7,205,999 B2 | 4/2007 | Leather | |
| 7,230,618 B2 | 6/2007 | Keller | |
| 7,307,638 B2 | 12/2007 | Leather et al. | |
| 7,307,640 B2 | 12/2007 | Demers et al. | |
| 7,317,459 B2 | 1/2008 | Fouladi et al. | |
| 7,362,332 B2 | 4/2008 | Gritz | |
| 7,403,494 B2 | 7/2008 | Lee et al. | |
| 7,446,780 B1 | 11/2008 | Everitt et al. | |
| 7,453,460 B2 | 11/2008 | Keller | |
| 7,453,461 B2 | 11/2008 | Keller | |
| 7,477,261 B2 | 1/2009 | Pallister | |
| 7,483,010 B2 | 1/2009 | Bai et al. | |
| 7,499,054 B2 | 3/2009 | Keller | |
| 7,538,772 B1 | 5/2009 | Fouladi et al. | |
| 7,576,748 B2 | 8/2009 | Van Hook et al. | |
| 7,616,200 B1 | 11/2009 | Heinrich et al. | |
| 7,623,726 B1 | 11/2009 | Georgiev | |
| 7,697,010 B2 | 4/2010 | Pallister | |
| 7,701,461 B2 | 4/2010 | Fouladi et al. | |
| 7,742,060 B2 | 6/2010 | Maillot | |
| 7,961,970 B1 | 6/2011 | Georgiev | |
| 7,973,789 B2 | 7/2011 | Cook | |
| 7,995,069 B2 | 8/2011 | Van Hook et al. | |
| 8,098,255 B2 | 1/2012 | Fouladi et al. | |
| 8,289,324 B1 * | 10/2012 | Laine et al. | 345/426 |
| 8,970,584 B1 | 3/2015 | Aila et al. | |
| 9,142,043 B1 | 9/2015 | Aila et al. | |
| 9,147,270 B1 | 9/2015 | Lehtinen et al. | |
| 9,153,068 B2 | 10/2015 | Laine et al. | |
| 2002/0078005 A1 | 6/2002 | Shi et al. | |
| 2003/0083850 A1 | 5/2003 | Schmidt et al. | |
| 2003/0225781 A1 | 12/2003 | Kusterer et al. | |
| 2003/0234789 A1 | 12/2003 | Gritz | |
| 2004/0249796 A1 | 12/2004 | Azzam | |
| 2006/0101242 A1 | 5/2006 | Siu et al. | |
| 2007/0046686 A1 | 3/2007 | Keller | |
| 2008/0001961 A1 | 1/2008 | Roimela et al. | |
| 2008/0091435 A1 | 4/2008 | Strope et al. | |
| 2008/0244241 A1 | 10/2008 | Barraclough et al. | |
| 2009/0167763 A1 | 7/2009 | Waechter et al. | |
| 2009/0213115 A1 * | 8/2009 | Keller et al. | 345/419 |
| 2009/0225080 A1 * | 9/2009 | Keller et al. | 345/426 |
| 2010/0077010 A1 * | 3/2010 | Aila et al. | 707/803 |
| 2010/0079451 A1 * | 4/2010 | Zhou et al. | 345/420 |
| 2011/0090337 A1 | 4/2011 | Klomp et al. | |
| 2012/0218264 A1 | 8/2012 | Clarberg et al. | |
| 2012/0293515 A1 | 11/2012 | Clarberg et al. | |
| 2013/0321420 A1 | 12/2013 | Laine et al. | |

OTHER PUBLICATIONS

Lauterbach, C., Garland, M., Segupta, S., Lubke, D., and Manocha, D. "Fast BVH Construction on GPUs." Computer Graphics Forum. Proceedings of Eurographics, 28, 2, 375-384, 2009).*

Parker, S., Bigler, J., Dietrich, A., Friedrich, H., Hoberock, J., Luebke, D., McAllister, D., McGuire, M., Morley, K., Robison, A., and Stich, M., "OptiX™: A General Purpose Ray Tracing Engine," ACM Transactions of Graphics SIGGRAPH Jul. 27, 2010, Los Angeles, CA, USA.*

Stich, M, Friedrich, H., and Dietrich, A. 2009. "Spatial Splits in Bounding Volume Hierarchies." In Proceedings of High-Performance Graphics 2009, 7-13.*

Wald, I., Benthin, C., and Slusallek, P. "Distributed Interactive Ray Tracing of Dynamic Scenes." 2003 In Proc. IEEE symp. on parallel and large-data visualization and graphics.*

Wald, I. and Mark, W. and Gunther, J. and Boulos, S. and Ize, T. and Hunt, W. and Parker, S. and Shirley, P. "State of the Art in Ray Tracing Animated Scenes." Computer Graphics Forum, v28, (6), p. 1691-1722, 2009, Wiley Online Library.*

S. Parker, J. Bigler, A. Dietrich, H. Friedrich, J. Hoberock, D. Luebke, D. McAllister, M. McGuire, K. Morley, A. Robison, and M. Stich, "OptiX™: A General Purpose Ray Tracing Engine," ACM Transactions of Graphics (SIGGRAPH Jul. 27, 2010, Los Angeles, CA, USA).

I. Wald, "Realtime Ray Tracing and Interactive Global Illumination," PhD thesis, Computer Graphics Group, Saarland University, 2004.

J. Bigler, A. Stephens, and S. Parker, "Design for Parallel Interactive Ray Tracing Systems," Proceedings of the IEEE Symposium on Interactive Ray Tracing, 2006, pp. 187-196.

Hou, Q., et al., "Micropolygon Ray Tracing with Defocus and Motion Blur," ACM Transactions on Graphics (TOG), vol. 29, Article 64, Jul. 2010, pp. 1-10.

Laine, S., et al., "Clipless Dual-Space Bounds for Faster Stochastic Rasterization," ACM Transactions on Graphics (TOG), vol. 30, Issue 4, Article 106, Jul. 2011, pp. 1-6.

Moller., et al., "Stochastic Rasterization Using Time-Continuous Triangles," ACM, Jan. 2007, pp. 1-11.

Wang Liqing; Research on Algorithms of Computational Geometry in GIS; China Master'S Theses Full-Text Database; Jan. 31, 2009.

McGuire, et al; "Hardware-Accelerated Global Illumination by Image Space Photon Mapping", HPG 2009, New Orleans, Louisiana, Aug. 1-3, 2009.

Linsen, et al; "Splat-based Ray Tracing of Point Clouds", Journal ofWSCG 15: 51-58, 2007.

Schaufler, et al; "Ray Tracing Point Sampled Geometry", In Proceedings of the Eurographics Workshop on Rendering Techniques 2000, p. 319-328, London, UK, 2000. Springer-Verlag.

P Haberli and K. Akeley, "The Accumulation Buffer: Hardware Support for High Quality Rendering," in Proc. SIGGRAPH 1990. pp. 309-318.

Kayvon Fatahalian, Edward Luong, Solomon Boulos, Kurt Akeley, William R. Mark, and Pat Hanrahan, "Data-Parallel Rasterization of Micropolygons with Defocus and Motion Blur," Proc. High Performance Graphics 2009.

* cited by examiner

Prior Art

HIERARCHICAL STRUCTURE FOR ACCELERATING RAY TRACING OPERATIONS IN SCENE RENDERING

BACKGROUND

Ray tracing is becoming an important alternative as a rendering method in high-performance interactive applications. This includes industrial and scientific three-dimensional visualization, but also extends to non-graphical applications like collision detection or the simulation of sound wave propagation. One of the most interesting and technically demanding possible use cases is rendering in computer games, which requires very high and constant image refresh rates combined with highly dynamic content. These performance requirements are particularly difficult to meet in a ray tracing environment.

One aspect that makes ray tracing more difficult to use as compared to traditional triangle rasterization is the fact that some kind of spatial index data structure has to be constructed before rendering can begin. Index (or acceleration) structures are used to perform visibility culling operations by enabling early rejection of large parts of a scene that are not visible (e.g., objects that are occluded by a wall). Without such data structures, tracing a single ray would take linear time in the number of geometric primitives in the scene, which is too costly in almost all scenarios. Since constructing the required data structures comes at a certain cost as well, it has to be carefully evaluated when and for which parts of the scene to execute a build. Moreover, not all types of data structures are equally well suited in different contexts. Usually, the challenge is to find a good tradeoff between construction speed and ray-geometry intersection performance.

Constructing an acceleration data structure over all the geometric primitives in the scene from scratch each frame is usually infeasible, as this essentially requires a sorting process. Thus, interactive ray tracing applications typically employ a hierarchical scene graph like structure to represent the scene organization, including geometric primitives and spatial indices. Only when changes are detected, data structures are actually rebuilt or updated at different hierarchy levels.

Figure 1:
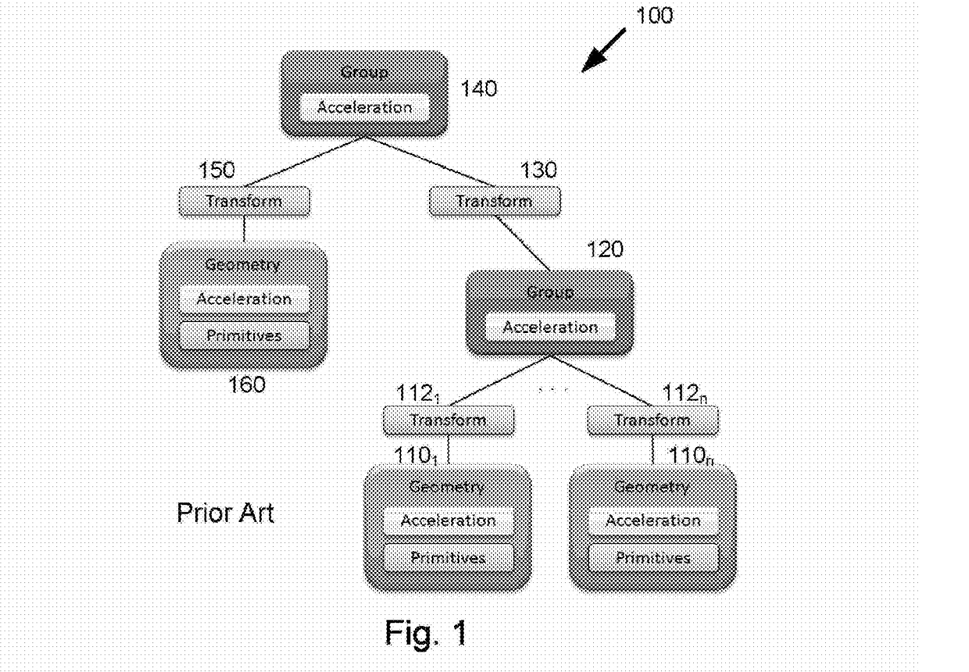
FIG. 1 illustrates a conventional hierarchical structure for accelerating ray tracing operations in scene rendering as known in the art.

FIG. 1 illustrates a conventional hierarchical structure 100 for performing ray tracing operations known in the art. The conventional hierarchical structure includes the following basic node types that are relevant in terms of interaction with acceleration structures:

Group nodes 120, 140 allow other nodes to be attached as children. This represents a region of a scene which is to be rendered and the union of all children. Each group node owns an acceleration data structure built over child bounding volumes.

Transform nodes $112_1$-$112_n$, 130, 150 represents a space transformation of the sub-tree below the transform node.

Geometry nodes $110_1$-$110_n$ hold a geometric object, along with an acceleration structure built over the primitives of the object. The geometric object includes a list of primitives which define a geometry included in the region represented by the highest level group node 140, which is referred to as the hierarchical group node.

The conventional hierarchical structure 100 is organized, such that the highest group node 140 represents the region of a scene which is to be rendered. Each of the geometry nodes $110_1$-$110_n$, 160 includes a plurality of primitives that collectively define a particular geometry. A group node 120 is constructed over several geometry nodes $110_1$-$110_n$, and defines an instantiation or graphical rendering of the combined geometries which are defined by each of the geometry objects $110_1$-$110_n$. A sole geometry node 160 provides a second geometry that is included within the region represented by the hierarchical group node 140.

As shown, the conventional hierarchical structure 100 implements an acceleration structure in each group 120, 140 and geometry node $110_1$-$110_n$, 160. Further particularly, the acceleration structures in geometry node are constructed over the geometric primitives of the node, while the acceleration structures in the groups are built over the bounding volumes (usually axis-aligned bounding boxes) of the underlying children.

For the vast majority of use cases, building acceleration structures at the group level is much cheaper compared to building acceleration structures at the geometry object level, as the number of elements to consider at the group level is much lower. As a consequence, some systems rebuild only the top-level structure every frame while not allowing rebuilds of the lower level geometry at all. In such an instance, however, only rigid transformations are efficiently supported. For non-rigid transformations, geometry objects have to be explicitly replaced by new geometry. Other systems do permit some additional flexibility, allowing, for example, arbitrary hierarchy depth, or incremental updates of acceleration structures in order to support deformation of geometry. However, these systems still operate using the same principle of associating one acceleration structure with each geometry node and each group node. Such an arrangement however requires a rebuild of the acceleration within the geometry nodes $110_1$-$110_n$, 160 whenever there is a change in the geometry defined by the geometry nodes, such a rebuild being computationally expensive and time consuming.

SUMMARY

A hierarchical structure for accelerating ray tracing operations is presented herein which addresses one or more of the aforementioned disadvantages. The hierarchical structure includes a plurality of geometry objects, and a single acceleration structure constructed over the collective plurality of geometry objects. Each geometry object includes primitives of a predefined type. The primitives within the plurality of geometry objects collectively define a geometry included within a region of the scene which is to be rendered. The single acceleration structure is operable for accelerating ray tracing operations for the primitives included within the plurality of geometry objects, and is constructed over the plurality of the geometry objects without an intervening bounding volume representation of the plurality of primitives included within the geometry objects.

In other embodiments of the invention, a system and method for constructing a hierarchical structure representing a region of a scene which is to be rendered are presented. The method includes organizing geometric primitives included within the region of the scene into a plurality of geometry objects, and constructing a single acceleration structure over the plurality of geometry objects. Each geometry object includes primitives of a predefined type. The primitives included within the plurality of geometry objects collectively define a geometry included within a region of a scene which is to be rendered. The single acceleration structure is operable for accelerating ray tracing operations for the primitives included within the plurality of geometry objects, and is constructed over the plurality of the geometry objects without an intervening bounding volume representation of the plurality of primitives included within the geometry objects.

In further embodiments of the invention, a system and method for rendering a region of a scene are presented. The method includes the aforementioned method of constructing a hierarchical structure representing a region of a scene, whereby primitives are organized into a plurality of geometry objects. A single acceleration structure is constructed over the plurality of geometry objects, whereby the construction excludes an intervening bounding volume representation of the plurality of primitives included within the geometry objects. The method further includes tracing a ray against the constructed hierarchical structure to render the region of the scene.

These and other aspects of the invention will be better understood in view of the following drawings and detailed description of some exemplary embodiments of the invention.

BRIEF DESCRIPTION OF THE DRAWINGS

For clarity, previously referred to features retain their indices in subsequent drawings.

DETAILED DESCRIPTION OF EXEMPLARY EMBODIMENTS

In accordance with the present invention, a new hierarchical structure is presented which represents a particular region of a scene which is to be rendered. The acceleration structures of the hierarchical structure are not associated with geometry objects of the hierarchical structure. Instead in the present invention, a new geometry group is introduced which is linked to an acceleration structure. The acceleration structure is constructed over all of the primitives contained in the child geometry objects, rather than over their node bounding volumes, as in prior art hierarchical structures. Compared to prior art approach in which a separate acceleration structure is associated with each geometry object and placing the geometric objects into a group (with an acceleration structure built over that group's bounding volumes), the arrangement of the present invention provides improved ray tracing performance, particularly when object bounding volumes overlap.

Figure 2:
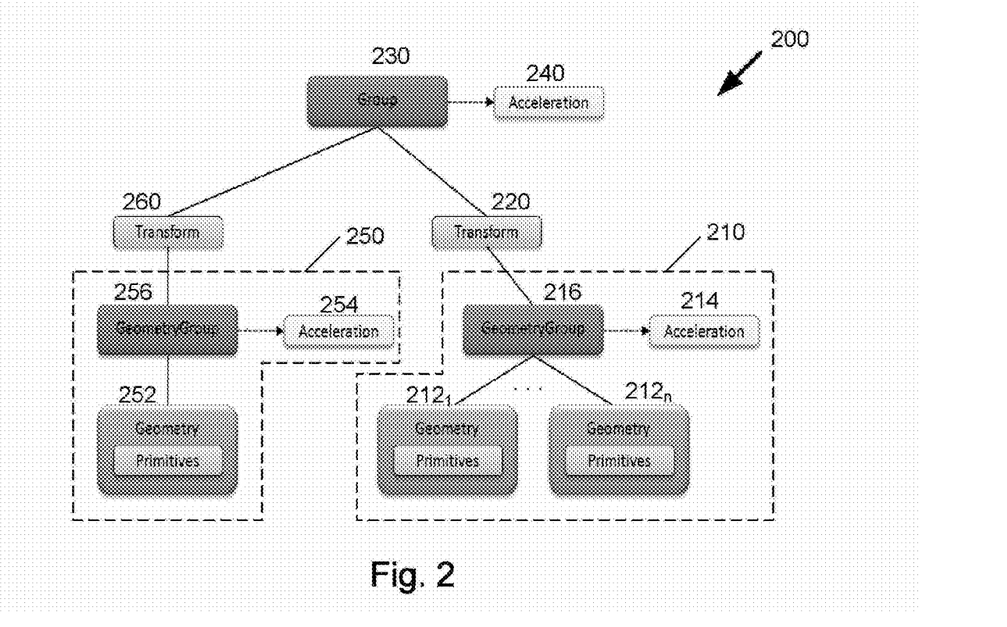
FIG. 2 illustrates a first embodiment of a hierarchical structure for accelerating ray tracing operations in scene rendering in accordance with the present invention.

FIG. 2 illustrates an exemplary hierarchical structure 200 for accelerating ray tracing operations in accordance with the present invention. The hierarchical structure 200 includes a plurality of geometry objects $212_1$-$212_n$ and a single acceleration structure 214 constructed over the plurality of geometry objects $212_1$-$212_n$. Each geometry object 212 includes primitives of a particular type, In an exemplary embodiment, primitives of differing polygon types are grouped separately, e.g., spherical, rectangular and triangular polygons are grouped into respective geometry objects. The invention is not limited to polygon primitives, and any primitive (e.g., points, lines, higher order surfaces, etc.) may be used in accordance with the invention as well.

The primitives within the plurality of geometry objects $212_1$-$212_n$ collectively define a geometry with a region of a scene which is to be rendered. As an example, the hierarchical structure 200 may correspond to the region of a wheel for a car which is to be rendered. The geometry objects, exemplary two: a first geometry object $212_1$ containing rectangles to form a parallelogram, and a second geometry object $212_2$ (not explicitly shown) containing triangles to form a triangular mesh, collectively define a particular geometry of the wheel region, e.g., the rim of the wheel. That is, the rectangular and triangular primitives collectively form the geometry of the rim in the illustrated example. Other parts of the wheel region (e.g., the tire of the wheel) are defined by one or more additional geometry groups of the hierarchical group node, as will be described below.

The number of geometry objects 212 may be any arbitrary, and range from 2 to 100, or more, and more particularly 2 to 10. The invention is not limited to a particular number of geometry objects, and any number may be used in accordance with the invention. Further exemplary, each geometric object is associated with (i.e., linked to) a bounding box program and an intersection program, one or both of which are shared among the primitives of a geometry object.

The hierarchical structure 200 further includes a single acceleration structure 214 which is operable to accelerate ray tracing operations for the primitives included within the plurality of geometry objects $212_1$-$212_n$. In contrast to the conventional arrangement, the single acceleration structure is constructed over the plurality of the geometry objects without an intervening bounding volume representation of the plurality of primitives included within the geometry objects. In other words, a single acceleration structure is constructed over the geometric primitives of all geometry objects $212_1$-$212_n$ combined, without considering a bounding volume representation of each individual geometry object.

Further exemplary, the hierarchical structure 200 includes a geometry group 216 which forms a common node for the plurality of geometry objects $212_1$-$212_n$. The geometry group 216 defines an instantiation (i.e., a graphical representation or rendering) of the geometry that is defined by the primitives included within the plurality of geometry objects 212. The geometry group 216 may also include (or receive as an input) additional information about the material which is to be rendered, for example, the color, level of detail, or other aspects of the geometry's material property which are to affect the appearance of the geometry. In a particular embodiment, several geometry groups share the same underlying geometry objects $212_1$-$212_n$, and thus will render the same geometry, although can provide a different instantiation of that geometry. In this manner, the same geometry can be rendered with different materials or, more generally, different sets of input parameters or operations to be performed upon intersection of a ray and a primitive. An exemplary embodiment of this arrangement is further illustrated and described in connection with FIG. 3 below.

Further exemplary, the hierarchical structure 200 includes a transform node 220 constructed over the geometry group 216 and operable to perform a transformation of a geometry defined by the primitives included within the plurality of geometry objects $212_1$-$212_n$. The transform node represents a space transformation of the nodes or sub-tree below it, and exemplary is a 4×4 or a 4×3 matrix describing the transformation. Any conventional implementation of this node can be employed in accordance with the present invention.

Also exemplary, the hierarchical structure 200 includes a hierarchical group node 230 which is constructed over the transform node 220 and which corresponds to the region of the scene which is to be rendered. The hierarchical group node 230 is characterized by a bounding volume representation of the region which is to be rendered, and contains the primitives included within the geometry objects $212_1$-$212_n$. The hierarchical structure 200 further includes a second acceleration structure 240 constructed over the bounding volume representation of the hierarchical group node 230 and operable to accelerate ray tracing operations for the primitives included within the bounding volume representation.

In a particular embodiment of the invention, the hierarchical structure 200 includes one or more sub-trees, each sub-tree defining an instantiation of a particular geometry within the region that is defined by it parent hierarchical group node. Each sub-tree includes a geometry group, and a single acceleration structure which is constructed over the primitives included within the child geometry objects of the geometry group. Features 212, 214, and 216 represent an example of such a sub-tree 210. Per the above-described exemplary embodiment in which the hierarchical group node 230 represents a wheel region which is to be rendered and sub-tree 210 defines a first instantiation of the wheel region, e.g., a rim of the wheel region, the additional sub-tree structure 250 can operate to define a second instantiation of the region, for example a tire which is mounted on the rim.

The second sub-tree structure 250 includes a geometry object 252, a geometry group 256, and an acceleration structure 254. The geometry object 252 includes primitives which defines a second geometry included within the region corresponding to the hierarchical group node 230, e.g., the tire of the wheel region in the exemplary embodiment. The acceleration structure 254 is constructed over the primitives included within the geometry object 252, the acceleration structure omitting a bounding volume representation of those primitives. The geometry group 256 defines an instantiation of the primitives included within the geometry object 252. A transform node 260 is constructed over the geometry group 256 and is operable to perform a transformation of the instantiation which is defined by the geometry group 256. Exemplary, the transformation is an affine spatial transformation and is carried out using a 4×4 or a 4×3 matrix describing the transformation.

Collectively, the primitives included within the geometry objects $212_1$-$212_n$ and 252 represent all of the primitives included within the region corresponding to the hierarchical group node 230, and accordingly the bounding volume of the hierarchical group node 230 contains all of these primitives. The acceleration structure 240 is constructed over the bounding volume of the hierarchical group node 240 and is operable to accelerate ray tracing operations for these primitives.

As will be understood, the hierarchical structure of the present invention allows for a simpler combination of different geometry properties. For example, an acceleration structure can be easily built over several types of geometric primitives. Further exemplary, each type of primitive may be stored in a separate geometry object. In addition, keeping geometry objects conceptually separated provides an efficient and straightforward way to inform the construction routine as to which parts of the actual underlying geometry have changed, which can be useful to speed up the construction process.

The hierarchical structure of the present invention can be realized as a data structure stored on a computer readable medium, for example, volatile or non-volatile memory. Further exemplary, the acceleration structure(s), exemplary implemented as a data structure stored on a computer readable medium, is linked to the hierarchical structure as described above.

Figure 3:
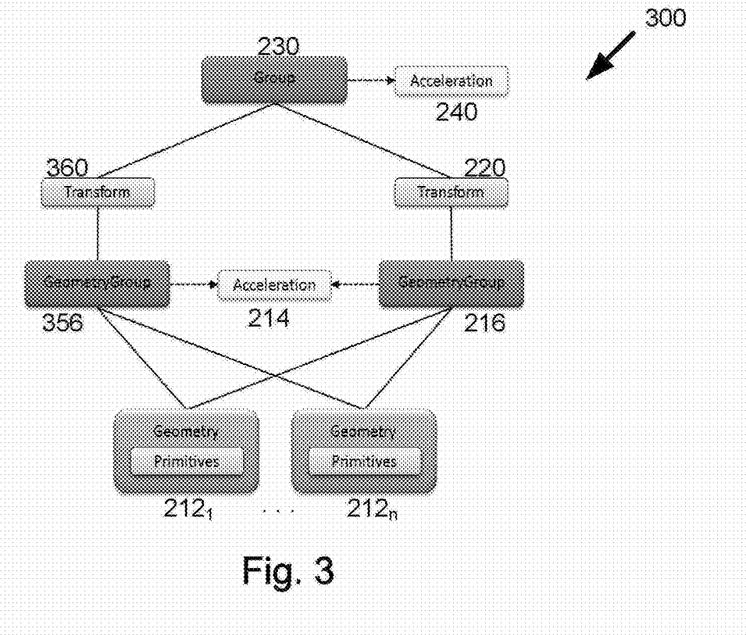
FIG. 3 illustrates a second embodiment of hierarchical structure for accelerating ray tracing operations in scene rendering in accordance with the present invention.

FIG. 3 illustrates a second embodiment of a hierarchical structure 300 for accelerating ray tracing operations in accordance with the present invention, whereby an acceleration structure is shared between multiple geometry groups. The hierarchical structure 300 includes the previously-described geometry objects $212_1$-$212_n$, an acceleration structure 214 for the geometry objects, a first geometry group 216, a transform node 220, a hierarchical group node 230, and an acceleration structure 240 of the hierarchical group node. The hierarchical structure 300 further includes a second geometry group 356, and a transform node 360. The second geometry group 356 defines a second instantiation for the geometry objects $212_1$-$212_n$, for example, providing a different color level for the geometry defined by the primitives in geometric objects $212_1$-$212_n$. The color can be stored as a shader parameter inside the geometry groups, where one geometry group exists for each instance, and thus shader parameters can vary across instances naturally. More generally, different attributes (e.g., different levels of detail, texture maps, shading programs) can be assigned to each instance. The transform node 360 is operable to perform a transformation of the instantiation defined by the geometry group 356.

Further exemplary, the hierarchical structure 300 employs an acceleration structure 214 which is shared between the first and second geometry groups 216 and 356. More generally, one acceleration structure can be shared between any number of geometry groups that share a common underlying geometry, i.e., have the same one or more geometry objects. The new hierarchical structure allows multiple separate groups to share geometric concepts, while differing in all other attributes that a group may contain. This arrangement minimizes the required memory footprint and construction time for the acceleration structure compared to using separate acceleration structures dedicated to each geometry group. Instancing can be implemented as inexpensive reuse of scene objects or parts of the hierarchy by referencing nodes (e.g., the aforementioned groups 230, geometry groups 216, 356, and/or geometry objects 212) multiple times instead of duplicating them. The sharing of an acceleration structure can be performed at any level of the hierarchy, and attaching/detaching an acceleration structure to/from a geometry group can be implemented as a highly efficient operation at runtime.

For prior art hierarchical structures, reconstruction of the acceleration structure is conventionally handled by propagating changes made to the geometry objects or transformation nodes to upper levels of the scene hierarchy, and rebuild all data structures encountered along the way. This is usually necessary, since in most cases, e.g. when a geometry object is deformed, its bounding volume changes, and thus a rebuild of the upper level data structure becomes necessary.

In an exemplary embodiment of the present invention, the client application explicitly marks each acceleration structure dirty if it needs a rebuild, and there is no automatic propagation of dirty flags. When a geometry group undergoes changes, it is not guaranteed that the associated acceleration structure will require rebuilding. For instance, in case a geometry group is exchanged against another one with the same spatial bounds, the resulting parent node acceleration structure would look exactly like the already existing one, and thus the cost of a reconstruction can be avoided. This notion of being flexible in terms of which objects the acceleration is built on (as opposed to what they look like) also fits very well into the concept of decoupling acceleration structures from the scene graph itself and attaching the acceleration structures to multiple geometry groups. Preferably, the basic elements on which the acceleration structure is built is referenced, e.g., using a child index.

Further exemplary, the client application also marks geometry objects as dirty whenever they would cause a change in the acceleration structure constructed over them. When an acceleration structure is built over more than one geometry objects (i.e. when the geometry group to which the structure is attached to has more than one child), the build routine may take advantage of "knowing" which pieces of geometry have undergone changes. It may then be able to cache certain pieces of data, and avoid re-computing the entire acceleration structure from scratch.

Figure 4:
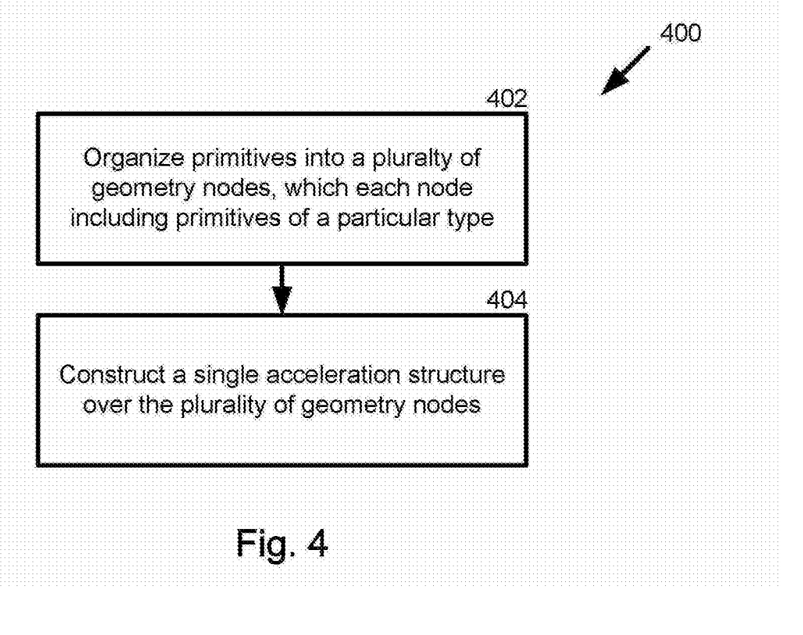
FIG. 4 illustrates a method for constructing a hierarchical structure illustrated in FIGS. 2 and 3 in accordance with the present invention.

FIG. 4 illustrates a method for constructing the hierarchical structure illustrated in FIGS. 2 and 3 in accordance with the invention. At 402, primitives included within a region of a scene are organized into a plurality of geometry objects $212_1$-$212_n$, each geometry object 212 including geometric primitives of a predefined type. Exemplary, primitives of the same type are included within the same geometry object. Exemplary types of primitives include points, lines, and polygons. A non-exhaustive list of polygons includes triangles and rectangles At 404, a single acceleration structure 214 is constructed over the plurality geometry objects 212 for accelerating ray tracing operations for the primitives included therein. Further particularly, the single acceleration structure 214 is constructed over the plurality of geometry objects 212 without an intervening bounding volume representation of the plurality of primitives.

The method 400 may include one or more additional operations consistent with construction of the hierarchical structures illustrated in FIGS. 2 and 3. For example, the method 400 optionally includes the operation of constructing a geometry group 216 which forms a common node of the plurality of geometry objects $212_1$-$212_n$, the geometry group defining an instantiation of the geometry defined by the primitives included within the plurality of geometry objects $212_1$-$212_n$. Additionally operations may be included in method 400, for example, constructing a transform node 220 constructed over the geometry group 216; constructing a hierarchical group node 230 over the transform node 220; and constructing a second acceleration structure 240 over a bounding volume associated with the hierarchical group node.

Consistent with the construction of the hierarchical structure shown in FIG. 2, the method 400 optionally includes one or more of the operations of: organizing primitives included within the region of the scene into a second geometry object 252; constructing a third acceleration structure 254 over the second geometry object 252; constructing a second geometry group 256 over the second geometry object 252, the second geometry group 256 defining an instantiation of the geometry defined by the primitives included within the geometry object 252; and, constructing a transform node 260 constructed over the second geometry group 256.

Consistent with the construction of the hierarchical structure shown in FIG. 3, the method 400 optionally includes the operation of constructing a second geometry group 356 which forms a second common node for the plurality of geometry objects $212_1$-$212_n$, whereby the first geometry group 216 forms a first common node for the geometry objects $212_1$-$212_n$ and defines a first instantiation of the primitives included within the plurality of geometry objects $212_1$-$212_n$, and the second geometry group defines a second instantiation of the primitives included within the plurality of geometry objects $212_1$-$212_n$.

Figure 5:
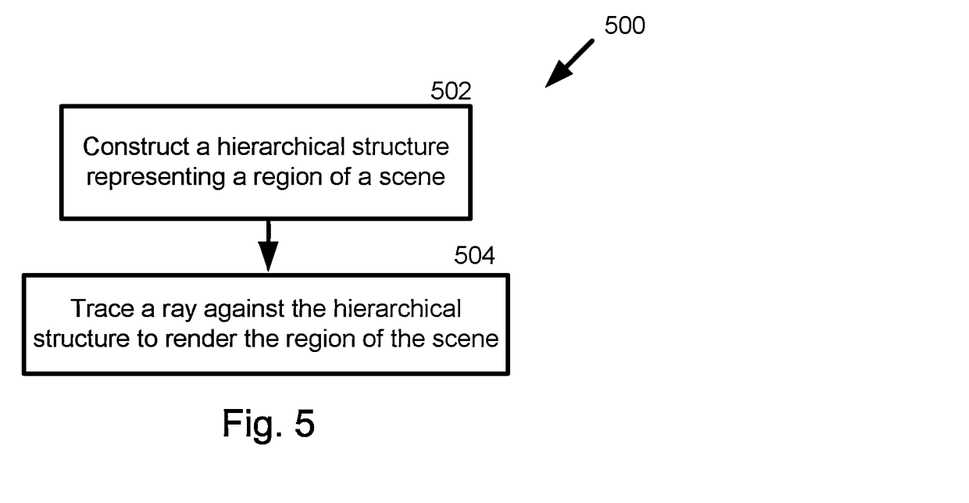
FIG. 5 illustrates a method for rendering a region represented by a hierarchical structure illustrated in FIGS. 2 and 3 in accordance with the present invention.

FIG. 5 illustrates a method for rendering a region represented by a hierarchical structure illustrated in FIGS. 2 and 3 in accordance with the present invention. At 502, a hierarchical structure representing a region of a scene is constructed, an exemplary embodiment of which is described in FIG. 4 above. At 504, a ray is traced against the constructed hierarchical structure to render the region of the scene. Operation 504 may be performed in accordance with any known ray tracing algorithms, some of which are disclosed in the references "An Introduction to Ray Tracing" by A. Glassner, Morgan Kaufmann, 1989, and "Realistic Ray Tracing, Second Edition" by P. Shirley, and R. Keith Morley, A K Peters, 2003.

Figure 6:
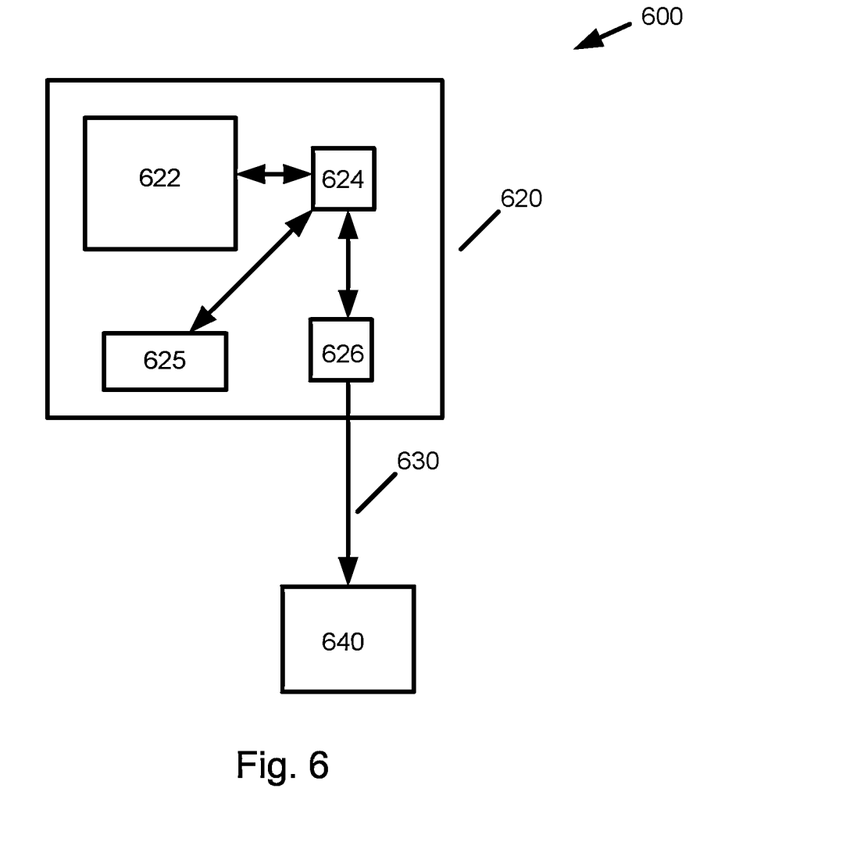
FIG. 6 illustrates a system for performing methods of FIGS. 4 and 5 in accordance with the present invention.

FIG. 6 illustrates an exemplary system 600 in which the methods of FIGS. 2-5 finds utility in accordance with the present invention. The system 600, exemplary a computer system, includes a graphics processing sub-system 620 and an output device 640, such as a monitor or printer. The graphics processing sub-system 620 includes a processor 622, a memory interface 624, a frame buffer 625, and a scanout processor 626. The processor 622 is operable to perform any or all of the operations illustrated in FIGS. 2-5 herein, and is a parallel processing architecture in an exemplary embodiment. A frame buffer 626 is operably coupled to the processor 622 for receiving rasterized and raytraced fragment values for each frame, and for reading out a composite image of each frame to the output device 640 via memory interface 624 and link 630 (e.g., a DVI link). In a specific embodiment, the processor 622 is operable to carry out one, several, or all of the operations described in any one, several or more of FIGS. 2-5. Further, the processor 622 may store instruction code for performing the methods of FIGS. 2-5. In an alternative embodiment, system 600 may take on different forms (e.g., a personal digital assistant, an internet device, a mobile telephone, or other mobile device), and processor 620 may be an embedded in such different systems. Further alternatively, the processor 622 may take the form of an application specific integrated circuit or other hardware/firmware circuit operable to carry out the operations illustrated in any one, several, or all of FIGS. 2-5.

In one embodiment, system 600 is operable to perform the operations illustrated in FIG. 4. In this embodiment, the system 600 includes processing circuitry 622 operable to organize primitives included within the region of the scene into a plurality of geometry objects $212_1$-$212_n$, each geometry object 212 including primitives of a predefined type, wherein primitives of the same type are included within the same geometry object, and wherein the primitives included within the plurality of geometry objects collectively define a geometry included within a region of a scene which is to be rendered. The system 600 further includes processor circuitry 622 operable to construct a single acceleration structure 216 constructed over the plurality of geometry objects $212_1$-$212_n$, the single acceleration structure operable to accelerate ray tracing operations for the primitives included within the plurality of geometry objects $212_1$-$212_n$, whereby the single acceleration structure is constructed over the plurality of the geometry objects $212_1$-$212_n$ without an intervening bounding volume representation of the plurality of primitives included within the geometry objects $212_1$-$212_n$.

In another embodiment, system 600 is operable to perform the operations illustrated in FIG. 5. In such a system, the processor 622 includes processor circuitry operable to construct a hierarchical structure representing a region of a scene according to FIG. 5, and processing circuitry operable to trace a ray against the hierarchical structure to render the region of the scene.

As readily appreciated by those skilled in the art, the described processes and operations may be implemented in hardware, software, firmware or a combination of these implementations as appropriate. In addition, some or all of the described processes and operations may be carried out as a computer-implemented method, or as computer readable instruction code resident on a computer readable medium, the instruction code operable to control a computer of other such programmable device to carry out the intended functions. The computer readable medium on which the instruction code resides may take various forms, for example, a removable disk, volatile or non-volatile memory, etc.

In a particular embodiment of the invention, a memory (which may be included locally within the processor 620 or globally within system 600) is operable to store instructions for performing any of the operations illustrated in FIGS. 2-5. The memory may take various forms, e.g., a removable disk, an embedded memory, etc., in volatile or non-volatile form, and may be included within a variety of different systems, e.g. a computer system, an embedded processor, a graphics processor, or graphics processing sub-system, such as a graphics card.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serves to refer to one exemplary embodiment of a claimed feature, and the claimed feature is not limited to the particular embodiment referred to by the reference indicia. The scope of the claimed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A non-transitory storage device comprising a plurality of computer-executable instructions stored therein, wherein the computer-executable instructions comprise:
   instructions to render a scene, wherein the instructions to render a scene include:
   instructions to generate a hierarchical structure that represents a region of the scene which is to be rendered, wherein the instructions to generate the hierarchical structure comprise:
   instructions to implement a plurality of geometry objects including primitives included within the region of the scene, each geometry object comprising primitives of a predefined type, wherein the primitives included within the plurality of geometry objects collectively define a geometry included within the region of the scene which is to be rendered;
   instructions to implement a single acceleration structure constructed over the primitives of the plurality of geometry objects without considering a bounding volume representation of the individual geometry objects, the single acceleration structure operable to accelerate ray tracing operations for the primitives included within the plurality of geometry objects;
   instructions to implement a geometry group that forms a common node for the plurality of geometry objects, wherein the geometry group defines an instantiation of the geometry defined by the primitives included within the plurality of geometry objects, wherein instead of the primitives and the plurality of geometry objects being linked to the single acceleration structure, the geometry group is linked to the single acceleration structure; and
   instructions to implement a transform node constructed over the geometry group, wherein the transform node is operable to perform an affine transformation of the instantiation defined by the geometry group.

2. The non-transitory storage device of claim 1, wherein the primitives of the same type are included within the same geometry object.

3. The non-transitory storage device of claim 1, wherein the instructions to generate the hierarchical structure further comprise:
   instructions to implement a hierarchical group node constructed over the transform node, the hierarchical group node corresponding to the region of the scene which is to be rendered.

4. The non-transitory storage device of claim 3, wherein the hierarchical group node is characterized by a bounding volume which envelops the primitives included within the plurality of geometry objects, wherein the instructions to generate the hierarchical structure further comprise:
   instructions to implement a second acceleration structure constructed over the bounding volume of the hierarchical group node and operable to accelerate ray tracing operations for the primitives included within the bounding volume of the hierarchical group node.

5. The non-transitory storage device of claim 4, wherein the geometry group comprises a first geometry group forming a common node for the plurality of geometry objects and defining an instantiation of the primitives included within the plurality of first geometry objects for the region in the scene, wherein the instructions to generate the hierarchical structure further comprise:
   instructions to implement a second geometry object comprising primitives defining a geometry for the region of the scene;

instructions to implement a third acceleration structure constructed over the primitives of the second geometry object for accelerating ray tracing operations for the primitives included within the second geometry object, wherein the third acceleration structure is constructed over the primitives of the second geometry object without considering a bounding volume representation of the individual second geometry object;

instructions to implement a second geometry group defining an instantiation of the geometry defined by the second primitives included within the second geometry object; and instructions to implement a second transform node constructed over the second geometry group, the transform node operable to perform an affine transformation of the instantiation by the second geometry group;

wherein the bounding volume of the hierarchical group node envelops the primitives included within the plurality of first geometry objects and the primitives included within the second geometry object, and wherein the second acceleration structure constructed over the bounding volume of the hierarchical group node is operable to accelerate ray tracing operations for the primitives included within the bounding volume of the hierarchical group node.

6. The non-transitory storage device of claim 1, wherein the geometry group comprises a first geometry group forming a first common node for the plurality of geometry objects and defining a first instantiation of the primitives included within the plurality of geometry objects, wherein the instructions to generate the hierarchical structure further comprise:

instructions to implement a second geometry group forming a second common node for the plurality of geometry objects and defining a second instantiation of the primitives included within the plurality of geometry objects.

7. A method for constructing a hierarchical structure representing a region of a scene which is to be rendered, the method comprising:

by using a computer, organizing primitives included within the region of the scene into a plurality of geometry objects, each geometry object comprising primitives of a predefined type, wherein primitives of the same type are included within the same geometry object, and wherein the primitives included within the plurality of geometry objects collectively define a geometry included within the region of the scene which is to be rendered;

by using the computer, constructing a single acceleration structure over the primitives of the plurality of geometry objects without considering a bounding volume representation of the individual geometry objects, the single acceleration structure operable to accelerate ray tracing operations for the primitives included within the plurality of geometry objects;

by using the computer, forming a geometry group as a common node for the plurality of geometry objects, wherein the geometry group defines an instantiation of the geometry defined by the primitives included within the plurality of geometry objects, wherein instead of the primitives and the plurality of geometry objects being linked to the single acceleration structure, the geometry group is linked to the single acceleration structure; and by using the computer, constructing a transform node over the geometry group, wherein the transform node is operable to perform an affine transformation of the instantiation defined by the geometry group.

8. The method of claim 7, wherein the geometry group comprises a first geometry group forming a first common node for the plurality of geometry objects and defining a first instantiation of the primitives included within the plurality of geometry objects, the method further comprising constructing a second geometry group which forms a second common node for the plurality of geometry objects and defining a second instantiation of the primitives included within the plurality of geometry objects.

9. A method for rendering a region of a scene, comprising:

(i) by using a computer, constructing a hierarchical structure representing the region of the scene, comprising:

organizing primitives included within the region of the scene into a plurality of geometry objects, each geometry object comprising primitives of a predefined type, wherein the primitives included within the plurality of geometry objects collectively define a geometry included within the region of the scene which is to be rendered;

constructing a single acceleration structure over the primitives of the plurality of geometry objects without considering a bounding volume representation of the individual geometry objects, the single acceleration structure operable to accelerate ray tracing operations for the primitives included within the plurality of geometry objects;

forming a geometry group as a common node for the plurality of geometry objects, wherein the geometry group defines an instantiation of the geometry defined by the primitives included within the plurality of geometry objects, wherein instead of the primitives and the plurality of geometry objects being linked to the single acceleration structure, the geometry group is linked to the single acceleration structure; and constructing a transform node over the geometry group, wherein the transform node is operable to perform an affine transformation of the instantiation defined by the geometry group; and (ii) by using the computer, tracing a ray against the hierarchical structure to render the region of the scene.

10. The method of claim 9, wherein primitives of the same type are included within the same geometry object.

11. The method of claim 9, wherein the geometry group comprises a first geometry group forming a first common node for the plurality of geometry objects and defining a first instantiation of the primitives included within the plurality of geometry objects, and wherein (i) further comprises constructing a second geometry group which forms a second common node for the plurality of geometry objects and defining a second instantiation of the primitives included within the plurality of geometry objects.

12. A system for constructing a hierarchical structure representing a region of a scene which is to be rendered, the system comprising:

processor circuitry operable to organize primitives included within the region of the scene into a plurality of geometry objects, each geometry object comprising primitives of a predefined type, and wherein the primitives included within the plurality of geometry objects collectively define a geometry included within the region of the scene which is to be rendered;

processor circuitry operable to construct a single acceleration structure over the primitives of the plurality of geometry objects without considering a bounding volume representation of the individual geometry objects, the single acceleration structure operable to accelerate ray tracing operations for the primitives included within the plurality of geometry objects;

processor circuitry operable to form a geometry group as a common node for the plurality of geometry objects, wherein the geometry group defines an instantiation of the geometry defined by the primitives included within the plurality of geometry objects, wherein instead of the primitives and the plurality of geometry objects being linked to the single acceleration structure, the geometry group is linked to the single acceleration structure; and processor circuitry operable to construct a transform node over the geometry group, wherein the transform node is operable to perform an affine transformation of the instantiation defined by the geometry group.

13. The system of claim 12, wherein primitives of the same type are included within the same geometry object.

14. The system of claim 12, wherein the geometry group comprises a first geometry group forming a first common node for the plurality of geometry objects and defining a first instantiation of the primitives included within the plurality of geometry objects, the system further comprising processor circuitry operable to construct a second geometry group which forms a second common node for the plurality of geometry objects and defining a second instantiation of the primitives included within the plurality of geometry objects.

15. A system for rendering a region of a scene, the system comprising:
(i) a processor operable to construct a hierarchical structure representing the region of the scene, comprising:
processor circuitry operable to organize primitives included within the region of the scene into a plurality of geometry objects, each geometry object comprising primitives of a predefined type, and wherein the primitives included within the plurality of geometry objects collectively define a geometry included within the region of the scene which is to be rendered;
processor circuitry operable to construct a single acceleration structure over the primitives of the plurality of geometry objects without considering a bounding volume representation of the individual geometry objects, the single acceleration structure operable to accelerate ray tracing operations for the primitives included within the plurality of geometry objects;
processor circuitry operable to form a geometry group as a common node for the plurality of geometry objects, wherein the geometry group defines an instantiation of the geometry defined by the primitives included within the plurality of geometry objects, wherein instead of the primitives and the plurality of geometry objects being linked to the single acceleration structure, the geometry group is linked to the single acceleration structure; and
processor circuitry operable to construct a transform node over the geometry group, wherein the transform node is operable to perform an affine transformation of the instantiation defined by the geometry group; and
(ii) processor circuitry operable to trace a ray against the hierarchical structure to render the region of the scene.

16. The system of claim 15, wherein the geometry group comprises a first geometry group forming a first common node for the plurality of geometry objects and defining a first instantiation of the primitives included within the plurality of geometry objects, and wherein (i) further comprises processor circuitry operable to construct a second geometry group which forms a second common node for the plurality of geometry objects and defining a second instantiation of the primitives included within the plurality of geometry objects.

17. A computer program product, resident on a non-transitory computer readable medium, and operable to store instructions for constructing a hierarchical structure representing a region of a scene which is to be rendered, the computer program product comprising:
instructions code operable to organize primitives included within the region of the scene into a plurality of geometry objects, each geometry object comprising primitives of a predefined type, wherein the primitives included within the plurality of geometry objects collectively define a geometry included within the region of the scene which is to be rendered;
instructions code operable to construct a single acceleration structure over the primitives of the plurality of geometry objects without considering a bounding volume representation of the individual geometry objects, the single acceleration structure operable to accelerate ray tracing operations for the primitives included within the plurality of geometry objects;
instructions code operable to form a geometry group as a common node for the plurality of geometry objects, wherein the geometry group defines an instantiation of the geometry defined by the primitives included within the plurality of geometry objects, wherein instead of the primitives and the plurality of geometry objects being linked to the single acceleration structure, the geometry group is linked to the single acceleration structure; and
instructions code operable to construct a transform node over the geometry group, wherein the transform node is operable to perform an affine transformation of the instantiation defined by the geometry group.

18. A computer program product, resident on a non-transitory computer readable medium, and operable to store instructions for rendering a region of a scene, the computer program product comprising:
(i) instructions code operable to construct a hierarchical structure representing the region of the scene, comprising:
instructions code operable to organize primitives included within the region of the scene into a plurality of geometry objects, each geometry object comprising primitives of a predefined type, wherein the primitives included within the plurality of geometry objects collectively define a geometry included within the region of the scene which is to be rendered;
instructions code operable to construct a single acceleration structure over the primitives of the plurality of geometry objects without considering a bounding volume representation of the individual geometry objects, the single acceleration structure operable to accelerate ray tracing operations for the primitives included within the plurality of geometry objects;
instructions code operable to form a geometry group as a common node for the plurality of geometry objects, wherein the geometry group defines an instantiation of the geometry defined by the primitives included within the plurality of geometry objects, wherein instead of the primitives and the plurality of geometry objects being linked to the single acceleration structure, the geometry group is linked to the single acceleration structure; and instructions code operable to construct a transform node over the geometry group, wherein the transform node is operable to perform an affine transformation of the instantiation defined by the geometry group; and (ii) instructions code operable to trace a ray against the hierarchical structure to render the region of the scene.

* * * * *